UNITED STATES PATENT OFFICE.

M. BOYES, OF POCAHONTAS, ILLINOIS.

IMPROVED MEDICAL COMPOUND FOR HOG-CHOLERA.

Specification forming part of Letters Patent No. 58,371, dated October 2, 1866.

*To all whom it may concern:*

Be it known that I, MARCUS BOYES, of Pocahontas, in the county of Bond and State of Illinois, have invented a new and useful Medical Compound for the Cure of Hog-Cholera and other diseases; and I do hereby declare that the following is a full, clear, and exact description thereof, which will enable others skilled in the art to make and use the same.

My useful compound is made in the following manner: sugar of lead, six grains; chlorate of potassa, twenty grains; Prussian blue, five grains; wheat starch, half-ounce.

Mix the above and reduce to a fine powder in a Wedgewood mortar or other suitable vessel, when the compound is ready for cure. The above forms one dose for a full-grown hog. Reduce the quantity for a younger or smaller animal. Three doses are generally sufficient to cure the diseased animal. The doses should be given at six-hour intervals.

The medicine should be mixed in boiling water, stirring as in making starch. One pint of boiling water is sufficient. On the day following I give Glauber's salts one large teaspoonful three times a day, mixed in the food of the animal.

The above compound will also cure all irregularities in the stomach and bowels of other animals, such as the——in horses and cattle, chicken-cholera, &c.

When the animal is so far gone with the disease that it cannot eat or drink, the medicine should be administered as a drench.

Having thus described my invention, I claim as new and desire to secure by Letters Patent—

The within-described medical compound, made of the ingredients and in the proportions substantially as herein described.

MARCUS BOYES.

Witnesses:
 JOSEPH WIBEL,
 SAMUEL A. CHALLIS.